United States Patent
Faulds et al.

(10) Patent No.: US 8,631,179 B1
(45) Date of Patent: Jan. 14, 2014

(54) SYSTEM AND METHOD FOR AUTOMATICALLY ASSIGNING BUS ADDRESSES TO SLAVE DEVICES

(75) Inventors: Gordon John Faulds, Dursley (GB); Allard Van Der Horst, Monmouthshire (GB)

(73) Assignee: Maxim Integrated Products, Inc., San Jose, CA (US)

(*) Notice: Subject to any disclaimer, the term of this patent is extended or adjusted under 35 U.S.C. 154(b) by 86 days.

(21) Appl. No.: 13/244,623

(22) Filed: Sep. 25, 2011

(51) Int. Cl.
*G06F 13/00* (2006.01)
*G06F 13/364* (2006.01)

(52) U.S. Cl.
CPC .................................. *G06F 13/364* (2013.01)
USPC .......................................................... 710/110

(58) Field of Classification Search
USPC ................ 710/8–19, 104–110, 306–311
See application file for complete search history.

(56) References Cited

U.S. PATENT DOCUMENTS

| | | | |
|---|---|---|---|
| 5,404,460 A * | 4/1995 | Thomsen et al. | 710/9 |
| 6,799,235 B2 * | 9/2004 | Bormann et al. | 710/110 |
| 6,912,606 B2 * | 6/2005 | Fay | 710/64 |
| 6,928,501 B2 * | 8/2005 | Andreas et al. | 710/110 |
| 7,065,593 B2 * | 6/2006 | Ripy et al. | 710/100 |
| 7,099,970 B1 * | 8/2006 | Foegelle et al. | 710/110 |
| 7,565,470 B2 * | 7/2009 | Lin | 710/110 |
| 7,631,110 B2 * | 12/2009 | Berenbaum et al. | 710/9 |
| 7,650,449 B2 * | 1/2010 | Lu | 710/106 |
| 7,707,339 B2 * | 4/2010 | Pigott et al. | 710/110 |
| 8,205,017 B2 * | 6/2012 | Parr et al. | 710/9 |
| 2002/0035658 A1 * | 3/2002 | Whetsel | 710/300 |
| 2008/0091862 A1 * | 4/2008 | Hiraka | 710/110 |

* cited by examiner

*Primary Examiner* — Raymond Phan
(74) *Attorney, Agent, or Firm* — TIPS Group

(57) ABSTRACT

An example method for generating bus addresses for slave devices on a two wire interface bus includes providing a base address to each of N slave devices connected to the two wire interface bus and providing a sequence of N−1 clock pulses to each of the N slave devices to provide unique bus addresses. Circuitry within each of the example slave devices is operative to receive a base address followed by a plurality of clock pulses from the host device and to increment the base address by a digital integer. Circuitry within each of the example slave devices is further operative to terminate incrementing of the base address when an inhibit logic signal is detected at the slave program input and to save an address resulting from incrementing the base address as a bus address subsequent to terminating the incrementing of the base address.

8 Claims, 5 Drawing Sheets

SYSTEM AND METHOD FOR AUTOMATICALLY ASSIGNING BUS ADDRESSES TO SLAVE DEVICES

BACKGROUND

Electronic systems often include a number of integrated circuit devices that need to communicate with each other and/or a master processor or controller. A serial two-wire bidirectional communication system has been developed to facilitate circuit design and simplify control strategies which has been alternatively named the two wire interface ("TWI") or inter-integrated circuit ("I²C") bus. It is therefore to be understood that a reference to the TWI is also a reference to the I²C bus and vice versa.

The TWI includes a serial data line ("SDA") and a clock line ("SCL"). Devices connected to the TWI can be designated as Masters or Slaves ("devices"), each of which has the capability to send or receive information.

For proper communication each device must have a unique address. This address can be hard-programmed into each device when it is manufactured, or can be assigned each time the system is "cold started" from a power-down condition. For systems with large numbers of slave devices, it is impractical to hard-program unique addresses into each device, so a method for assigning unique addresses is required. These unique addresses could be transmitted to the devices by adding additional communication lines at the cost of increasing the number of lines or "pins" of the integrated circuit ("IC") packages, but this is considered to be an undesirable in that it increases the cost, complexity and size of the IC's.

Andersson el al. in U.S. Pat. No. 6,629,172 ("Andersson") describes a system for assigning unique addresses to multiple devices attached to an I²C bus. As described by Andersson, when multiple devices share the I²C address the master device is unable to communicate with each device individually. Therefore, Andersson creates a circuit enable input to individually activate each device. Once a device is activated, the master device may communicate to the device a unique I²C bus address, after which the activated device only responds to the new address. Each device initially sharing the same address is activated individually until all devices have been assigned a unique address.

FIG. 1 is a block diagram illustrating a prior art system for assigning addresses to devices on a two wire interface bus. In this prior art system, each slave device is equipped with two additional pins. These additional pins are labeled "Enable In" and "Enable Out" in slave devices 108, 110, 112, and 114. The process of the prior art system begins with sending an enable signal 116 from the host processor or "Master" 102 to the first slave device 108 in the chain, followed by an address via the serial data 104 and clock 106 lines. After the address is stored in device 108, device 108 passes the enable signal to its "Enable Out" pin which is hard wired to the "Enable In" pin of the next slave device 110. The Master 102 then communicates the next address to device 110, and the process continues sequentially until all devices on the bus have their addresses.

A limitation of the prior art methods such as those described above is that each slave device must be assigned its address individually and in sequence. For a large number of slave devices, this can be very time consuming, particularly if many of the slave devices are powered up and down frequently to reduce system energy consumption.

These and other limitations of the prior art will become apparent to those of skill in the art upon a reading of the following descriptions and a study of the several figures of the drawing.

SUMMARY

In an embodiment, set forth by way of example and not limitation, a method for generating bus addresses for slave devices on a two wire interface bus includes sending a base address to each of N slave devices connected to the two wire interface bus, wherein N is greater than or equal to two, and sending a sequence of N−1 clock pulses to each of the N slave devices subsequent to sending the base address, wherein a unique bus address for each of the N slave devices is generated subsequent to receipt of the sequence of N−1 clock pulses.

In a further embodiment, set forth by way of example and not limitation, a method includes receiving a base address from a host device, creating a first provisional bus address by saving the base address as a first provisional bus address, receiving a first clock pulse from the host device, checking the logic state of the program input, and creating a second provisional bus address by incrementing the first provisional bus address by a digital integer if the logic state of the program input is at a first logic state.

In a further embodiment, set forth by way of example and not limitation, a system includes a host device and a plurality of slave devices interconnect by a serial data line and a serial clock line. The host device has a host program output and each of the slave devices has a slave program input and a slave program output. Circuitry within each of the slave devices is operative to receive a base address followed by a plurality of clock pulses from the host device and to increment the base address by a digital integer. Circuitry within each of the slave devices is further operative to terminate incrementing of the base address when an inhibit logic signal is detected at the slave program input and to save an address resulting from incrementing the base address as a bus address subsequent to terminating the incrementing of the base address.

An advantage of certain example embodiments is that a system and method is provided for assigning addresses to slave devices. A further advantage of certain example embodiments is that a fast system and method for assigning addresses to daisy-chained devices on a TWI bus is provided.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures.

DETAILED DESCRIPTION OF EXAMPLE EMBODIMENTS

Figure 1:
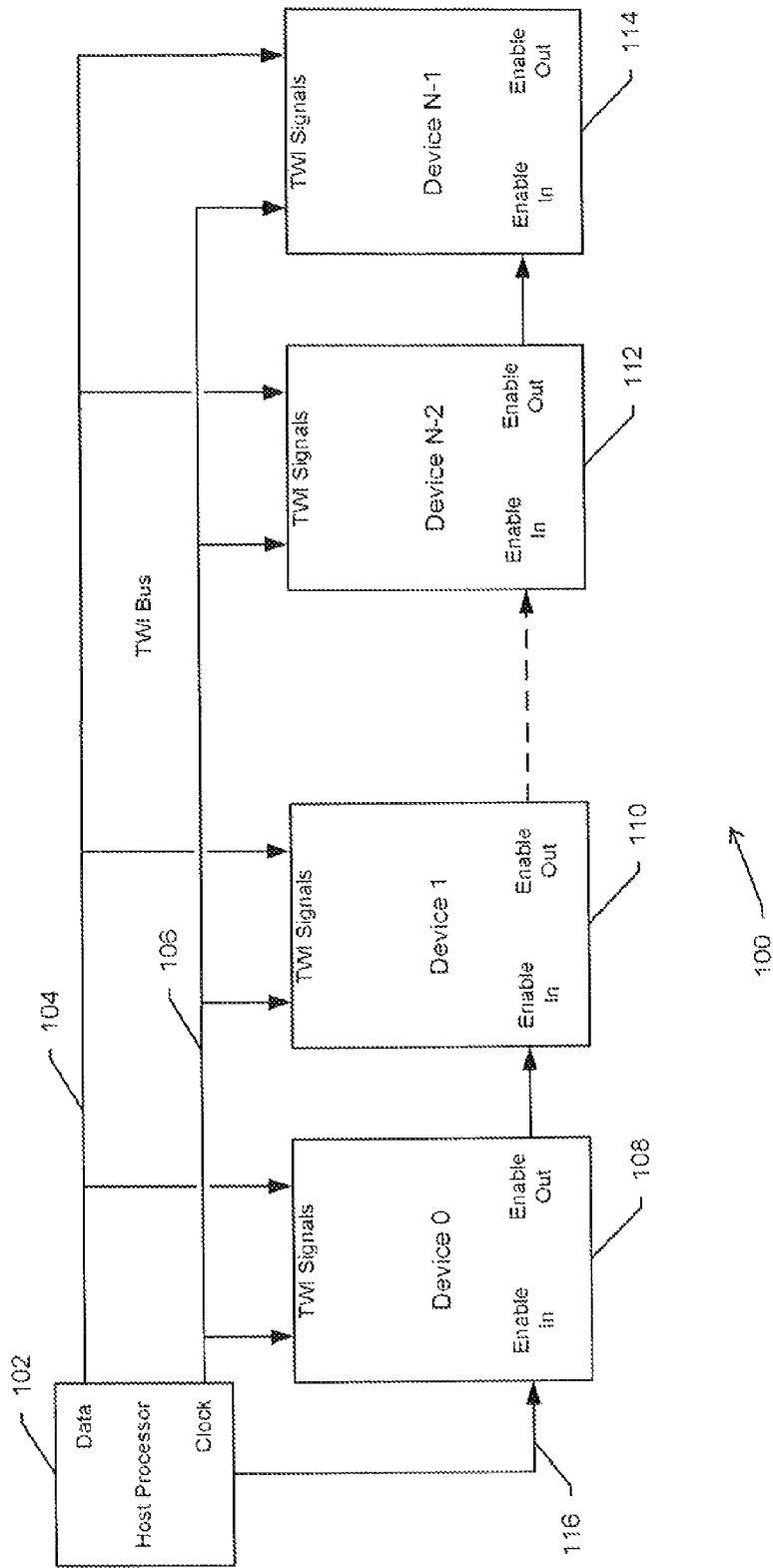
FIG. 1 is a block diagram of a prior art system for assigning addresses to devices on a two wire interface bus.
Figure 2:
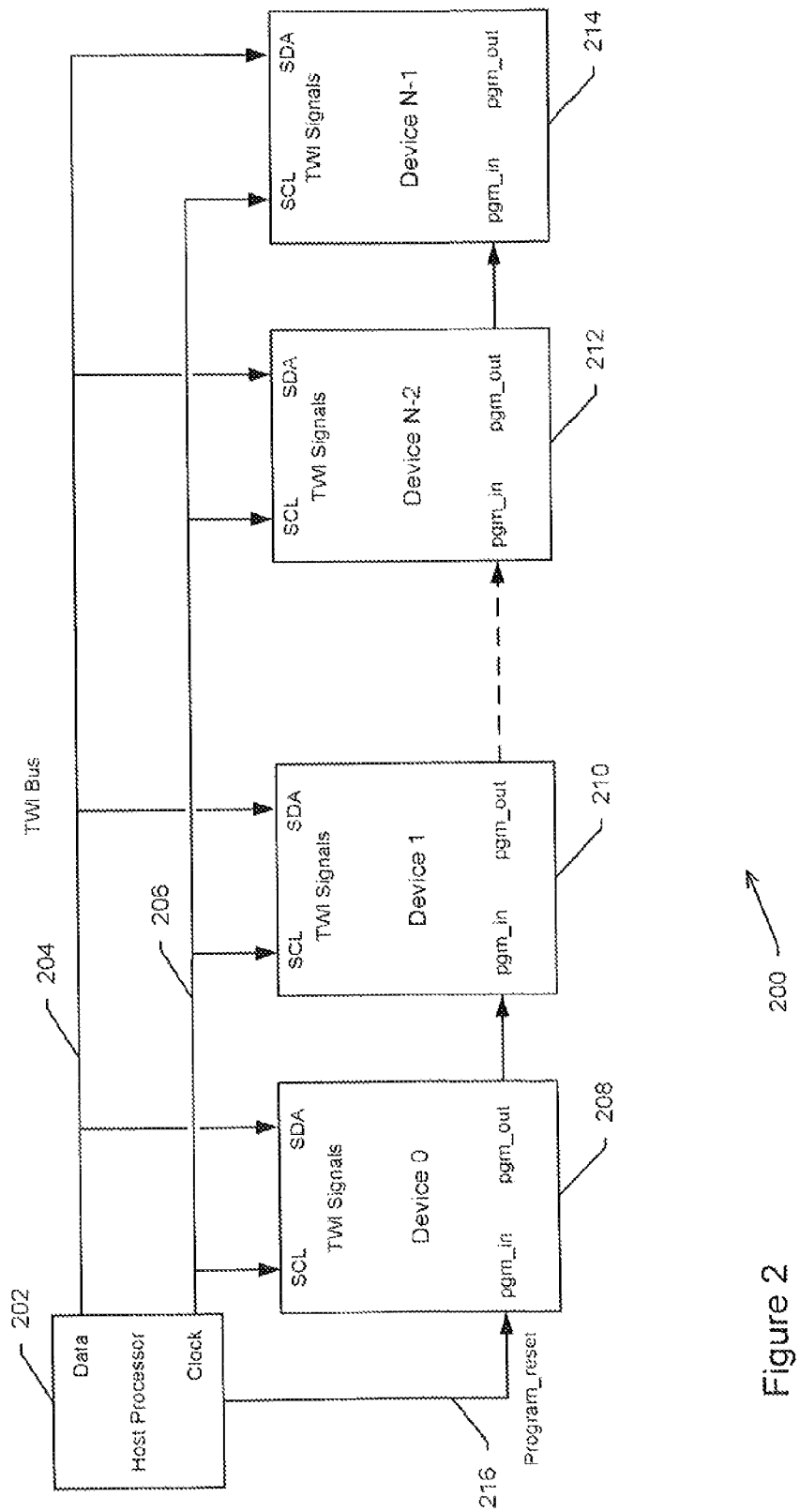
FIG. 2 is a block diagram of an example two wire bus system with daisy-chained slave devices.

FIG. 1 was discussed with reference to the prior art. FIG. 2 is a block diagram 200 of a two wire bus system and devices thereon, in accordance with a non-limiting example embodiment. The system of FIG. 2 comprises a host (or master) device 202 connected via a two wire interface (TWI or I²C) bus to N slave devices. The slave devices are also connected to each other and the host device 202 by a program signal line 216 in a "daisy chain" fashion, which establishes their order of proximity to the host device 202.

In FIG. 2, a slave device 208 ("Device 0") is connected closest to the host device 202, followed by slave device 210 ("Device 1"), a slave device 212 ("Device N−2") and a slave device 214 ("Device N−1). Slave Devices "Device 2" to "Device N−3" are not shown in order to simplify the figure. The host device 202 along with all slave devices are connected in parallel to both a data line 204 ("SDA") and a clock line 206 ("SCL").

In order for the host device to effectively communicate with the slave devices each slave device should have a unique bus address. However, the memory storing bus addresses is volatile such that an address must be assigned to each slave device upon power-up of the system. To accomplish this task, the host device 202 transmits a single base address to all slave devices and then transmits a program signal 216 to the first slave device 208 (Device 0) followed by a series of N−1 clock pulses (for a total of N slave devices) on the SCL line 206.

Address indexing circuitry in each slave device increments from the initial base address synchronous with the clock pulses. A unique final address is established within each slave device by passing the program signal from slave to slave in sequence from slave device 208 (Device 0) to slave device 214 (Device N−1) synchronously with the clock pulses. As the program signal is passed through each device, the counting process is inhibited, resulting in a unique set of addresses in each slave device.

By way of non-limiting example, the unique set of addresses can be increasing (numerically) in order from the first slave device 208 in the chain to the $N^{th}$ device 214 (Device N−1). It should be noted that the described embodiment has the advantage of carrying out the bus address initialization of any number of slave devices with only two additional pins per device, e.g. the "pgm_in" and "pgm_out" pins.

Figure 3:
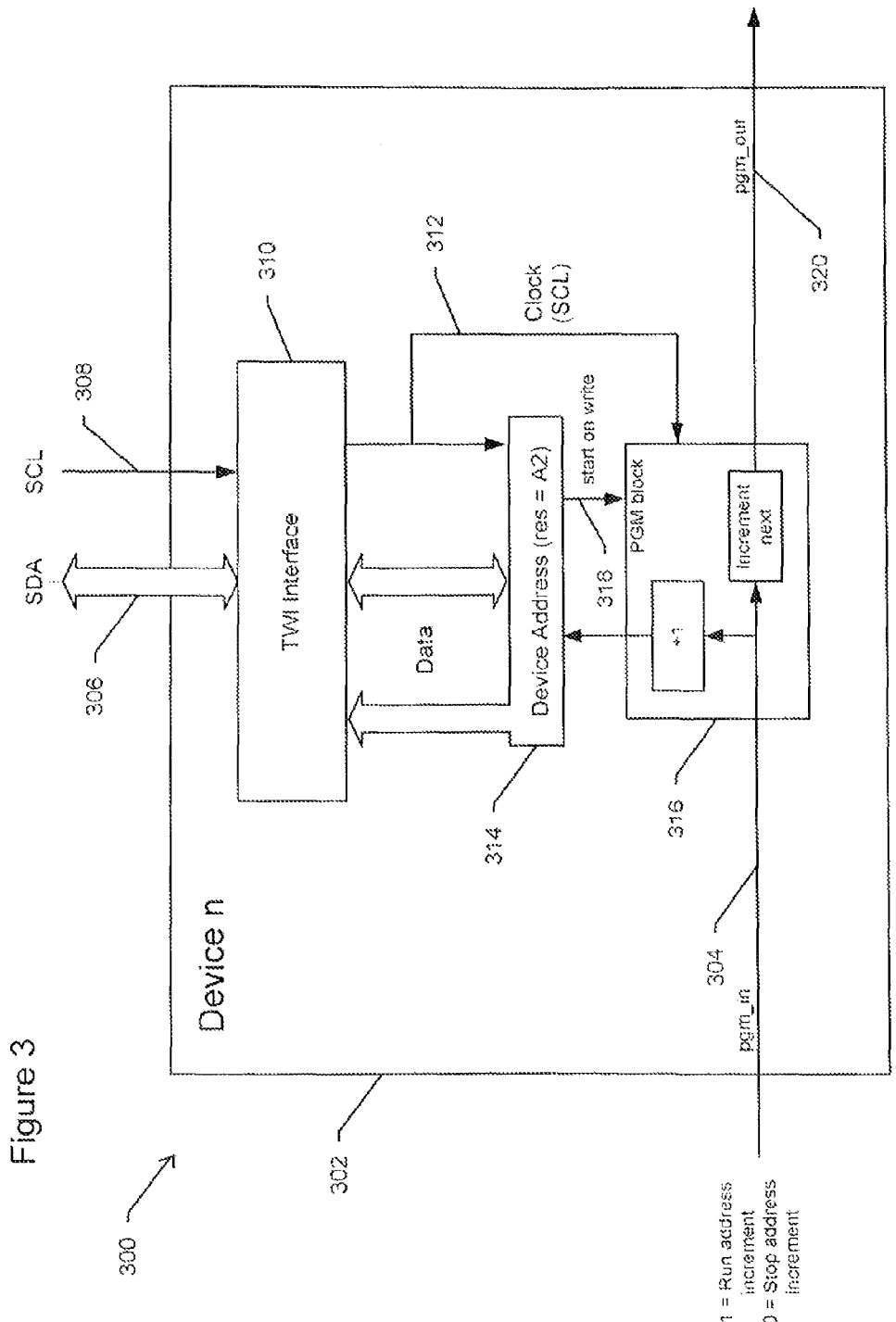
FIG. 3 is a block diagram of example internal components of a slave device.

FIG. 3 is a block diagram 300 of the internal components of a slave device 302 in accordance with a non-limiting example. Connections to slave device 302 include a TWI data bus ("SDA") 306, TWI clock ("SCL") 308, a pgm_in pin 304 and pgm_out pin 320. Internally, device 302 comprises a TWI interface module 310, address storage registers 314 and a PGM module 316.

A process, set forth by way of example and not limitation, for establishing slave device addresses will be explained with reference to FIGS. 2 and 3. Base address data is transmitted by the host device 202 to all slave devices. The initial base address received over the SDA bus enters the TWI module 310 and is distributed to the storage register 314. Once this address is stored, an enable signal 318 is sent to the PGM module 316 and the address incrementing process is started with the receipt of clock pulses sent from the host device 202 via the SCL lines 308 and 312. At the reception of each clock pulse, the address is incremented by a fixed digital integer, not necessarily a single bit, starting with the base address.

During this process, the signal line 304 pgm_in is monitored. At each clock pulse, the logic state of the pgm_in is transferred to the signal line 320 pgm_out. When the logic state of pgm_in goes from high (1, enable incrementing) to low (0, stop incrementing), the PGM module 316 ceases incrementing the address, and the final address is saved in register 314. Of course, the logic states may be reversed, as will be appreciated by those of skill in the art.

Figure 4:
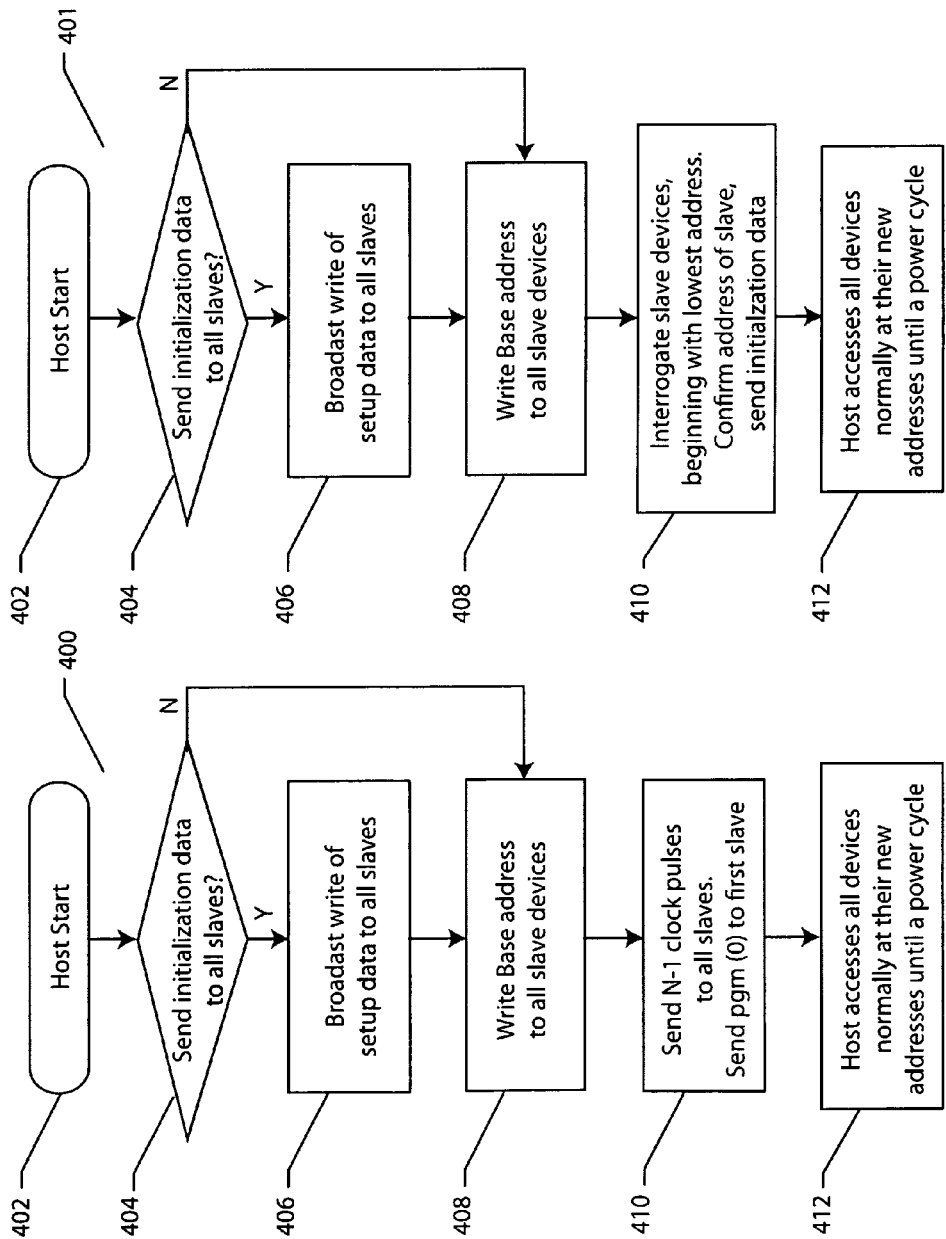
FIGS. 4a and 4b are example state machine processes for bus address assignment.

FIGS. 4a and 4b illustrate state machine processes 400, 401 for the address assignment process carried out by the host (master) device 202, in accordance with non-limiting examples. With reference to FIG. 4a, a state machine process starts at step 402 proceeding to decision block 404. If the user requires setup data to be sent to all slaves prior to the transmission of the base address, it is done in step 406. This is an optional process as this is not always required. All slaves will receive this data. If not, the process is routed to step 408, wherein the base address is sent to all slave devices. In the next step 410, N−1 clock pulses are sent via the SCL bus to all slaves, along with a low "pgm (0)" signal to the first slave (Device 0). Device 0 will maintain the base address, but will pass the pgm (0) signal from its pgm_in pin to its pgm_out pin and on to Device 1 through Device N−1. The clock pulses may be transmitted by the host device as a standalone process, or as a result of other communications on the bus to other devices. An example of this may be found in FIG. 4b, as will be described below. Subsequent to step 410, all the slaves have established their new addresses, and the process is terminated in step 412, wherein the host device accesses all slaves normally.

Turning to FIG. 4b, process steps 402 to 408 and 412 in this example are substantially the same as disclosed with reference to FIG. 4a. In example step 414, the clock pulses are sent out as a by-product of initiation of an inquiry to slave devices that have already established their addresses, starting with Device 0. Since a single communication inquiry may result in numerous clock pulses being sent out, this process assures that all slaves will have established their addresses long before all devices are queried, as long as the query process starts with Device 0 and proceeds in increasing order (Device 1, 2, 3, etc) from Device 0. This process can be considered, in some instances, to be an enhancement over the process described with reference to FIG. 4a, as the address query process confirms the slave addresses.

Figure 5:
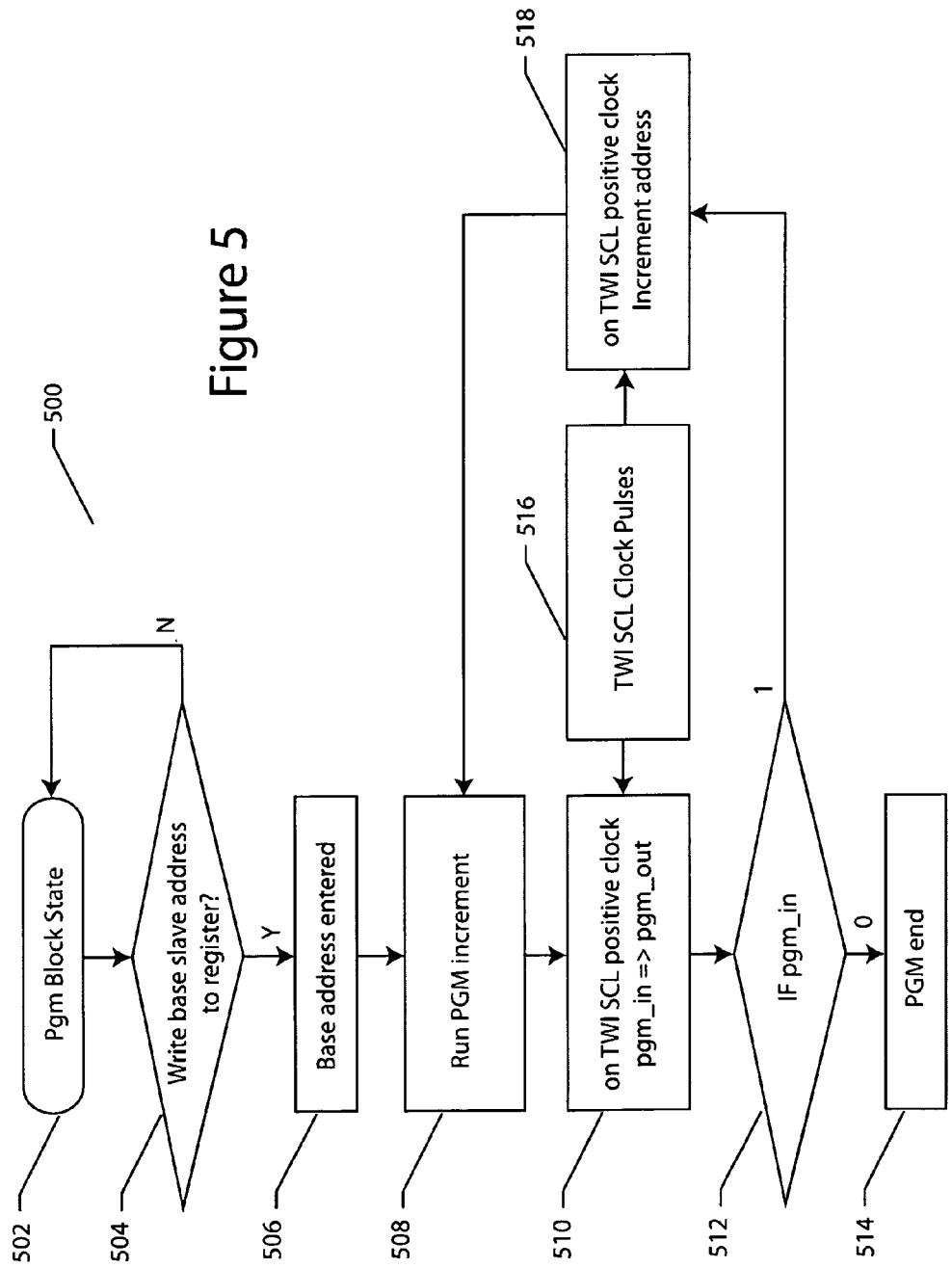
FIG. 5 is an example state machine process for an address incrementing process carried out by the slave devices.

FIG. 5 is a state machine process 500 for the address incrementing process carried out by the slave devices, in accordance with a non-limiting example embodiment. The process begins at step 502 and proceeds to decision step 504. If the base address has been sent to the slave device, it is entered into the register in step 506. If not, the process goes back to the start at step 502. If the base address has been entered, then the PGM increment module is started in step 508.

In a step 510, the logic state of the pgm_in is transferred to pgm_out in step with a clock pulse received on the SCL bus, from block 516. If the logic state of pgm_in is high (1), decision step 512 routes the process to step 518, and the address is incremented by a digital integer. If the logic state of pgm_in is low (0), then the incrementing of the address is terminated in step 514. Subsequent to step 518, the process is cycled back to step 508 where the process 1 continued until the logic state of pgm_in goes from high (1) to low (0). Of course, the selection of the pgm logic states are arbitrary, and can be inverted with no loss of functionality.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A method for generating bus addresses for slave devices on a two wire interface bus comprising:
    first sending, from a host device, a base address to each of N slave devices connected to a two wire interface bus wherein N is greater than or equal to two, wherein first slave device of said N slave devices comprises a first program input and a first program output, a second slave device of said N slave devices comprises a second program input and a second program output said first program input of said first slave device being connected to said host device, and said first program output of said first slave device being connected to said second program input of said second slave device;
    second sending a logic signal from said host device to said first program input of said first slave device; and
    third sending a sequence of N−1 clock pulses to each of said N slave devices; and
    generating, within each of said N slave devices, a unique bus address for each of said N slave devices subsequent to receipt of said sequence of N−1 clock pulses such that a bus address of an Nth slave device is set to a sum of said base address plus a digital product of (N−1) times a digital integer.

2. The method as recited in claim 1 wherein said logic signal is transferred from said first program input of said first slave to said first program output of said first slave subsequent to receipt of a first clock pulse of said sequence of N−1 clock pulses.

3. The method as recited in claim 1 wherein said logic signal is transferred from said second program input of said second slave to said second program output of said second slave subsequent to receipt of a second clock pulse of said sequence of N−1 clock pulses by said second slave device.

4. The method as recited in claim 1 wherein said logic signal is received at a program input of said Nth slave device subsequent to receipt of N−1 clock pulses of said sequence of N−1 clock pulses by said Nth slave device.

5. The method as recited in claim 4 wherein said bus address of said Nth slave device is computed by incrementing said base address by said digital integer for every clock pulse in said sequence of N−1 clock pulses received by said Nth slave device, said incrementing of said base address being terminated subsequent to receipt of said logic signal at said program input of said Nth device.

6. A method for establishing a bus address for a slave device on a two wire interface bus, said slave device having a program input and a program output, comprising:
    first receiving a base address from a host device;
    creating a first provisional bus address by saving said base address as said first provisional bus address;
    second receiving a first clock pulse from said host device;
    checking a logic state of said program input;
    creating a second provisional bus address by incrementing said first provisional bus address by a digital integer if said logic state of said program input is at a first logic state and using said first provisional bus address as said bus address if logic state of said program input is at a second logic state;
    third receiving a second clock pulse from said host device;
    checking said logic state of said program input; and
    creating a third provisional bus address by incrementing said second provisional bus address by a digital integer if said logic state of said program input is at said first logic state and using said second provisional bus address as said bus address if logic state of said program input is at a second logic state;
    wherein said logic state of said program input is transferred to said program output.

7. A system for automatically assigning bus addresses to slave devices connected by a two wire interface bus comprising:
    a host device, connected to a serial data line and a serial clock line, said host device having a host program output;
    a plurality of slave devices, each of said plurality of slave devices connected to said serial data line and to said clock line, each of said plurality of slave devices having a slave program input and a slave program output;
    circuitry within each of said plurality of slave devices operative to receive a base address followed by a plurality of clock pulses from said host device;
    circuitry within each of said plurality of slave devices operative to increment said base address by a digital integer synchronous with each of said plurality of clock pulses;
    circuitry within each of said plurality of slave devices operative to terminate incrementing of said base address when an inhibit logic signal is detected at said slave program input; and
    circuitry within each of said plurality of slave devices operative to save an address resulting from incrementing said base address as a bus address, subsequent to terminating said incrementing of said base address.

8. A system as recited in claim 7, further comprising circuitry within each of said plurality of slave devices is operative to pass said inhibit logic signal from said slave program input to said slave output, synchronous with each of said plurality of clock pulses, wherein a first slave device of said plurality of slave devices has said slave program input connected to said host program output, and a second slave device of said plurality of slave devices has said slave program input connected to said slave program output of said first slave device.

* * * * *